United States Patent

Kreh et al.

[11] Patent Number: 5,878,575
[45] Date of Patent: Mar. 9, 1999

[54] MASTER CYLINDER

[75] Inventors: Heinrich Kreh, Florstadt; Harald Konig, Ober-Morlen, both of Germany

[73] Assignee: ITT Manufacturing Enterprises Inc., Wilmington, Del.

[21] Appl. No.: 875,337
[22] PCT Filed: Jan. 30, 1996
[86] PCT No.: PCT/EP96/00352
  § 371 Date: Oct. 21, 1997
  § 102(e) Date: Oct. 21, 1997
[87] PCT Pub. No.: WO96/23683
  PCT Pub. Date: Aug. 8, 1996

[30] Foreign Application Priority Data

Feb. 2, 1995 [DE] Germany ............... 195 03 304.3

[51] Int. Cl.⁶ ............................................... B60T 11/20
[52] U.S. Cl. ........................... 60/562; 60/588; 60/589
[58] Field of Search ............................ 60/533, 562, 585, 60/588, 589, 592

[56] References Cited

U.S. PATENT DOCUMENTS

| | | |
|---|---|---|
| 1,819,482 | 8/1931 | Pentz . |
| 2,396,155 | 3/1946 | Christensen . |
| 3,191,385 | 6/1965 | Watanabe ........................ 60/562 X |
| 4,945,729 | 8/1990 | Hayashida et al. ................ 60/588 X |
| 5,046,315 | 9/1991 | Nakamura ............................ 60/562 |
| 5,063,743 | 11/1991 | Mori et al. ....................... 60/588 X |
| 5,187,934 | 2/1993 | Mori . |
| 5,251,446 | 10/1993 | Mori . |

FOREIGN PATENT DOCUMENTS

| | | |
|---|---|---|
| 2 327 896 | 2/1977 | France . |
| 1 239 202 | 4/1967 | Germany . |
| 26 45 992 | 4/1977 | Germany . |
| 33 12 192 | 10/1984 | Germany . |
| 40 24 483 | 2/1992 | Germany . |
| 2 266 752 | 11/1993 | United Kingdom . |
| WO 96/23683 | 8/1996 | WIPO . |

Primary Examiner—Hoang Nguyen
Attorney, Agent, or Firm—Rader, Fishman & Grauer PLLC

[57] ABSTRACT

A master cylinder includes a housing and a piston movable therein, which is sealed relative to a pressure chamber by way of a sealing element fixed on the housing. The pressure chamber is connectable to an unpressurized supply chamber by at least one transverse bore provided in the piston, wherein the transverse bore has a slot-shaped configuration and opens into at least one groove provided on the outer surface of the piston.

10 Claims, 3 Drawing Sheets

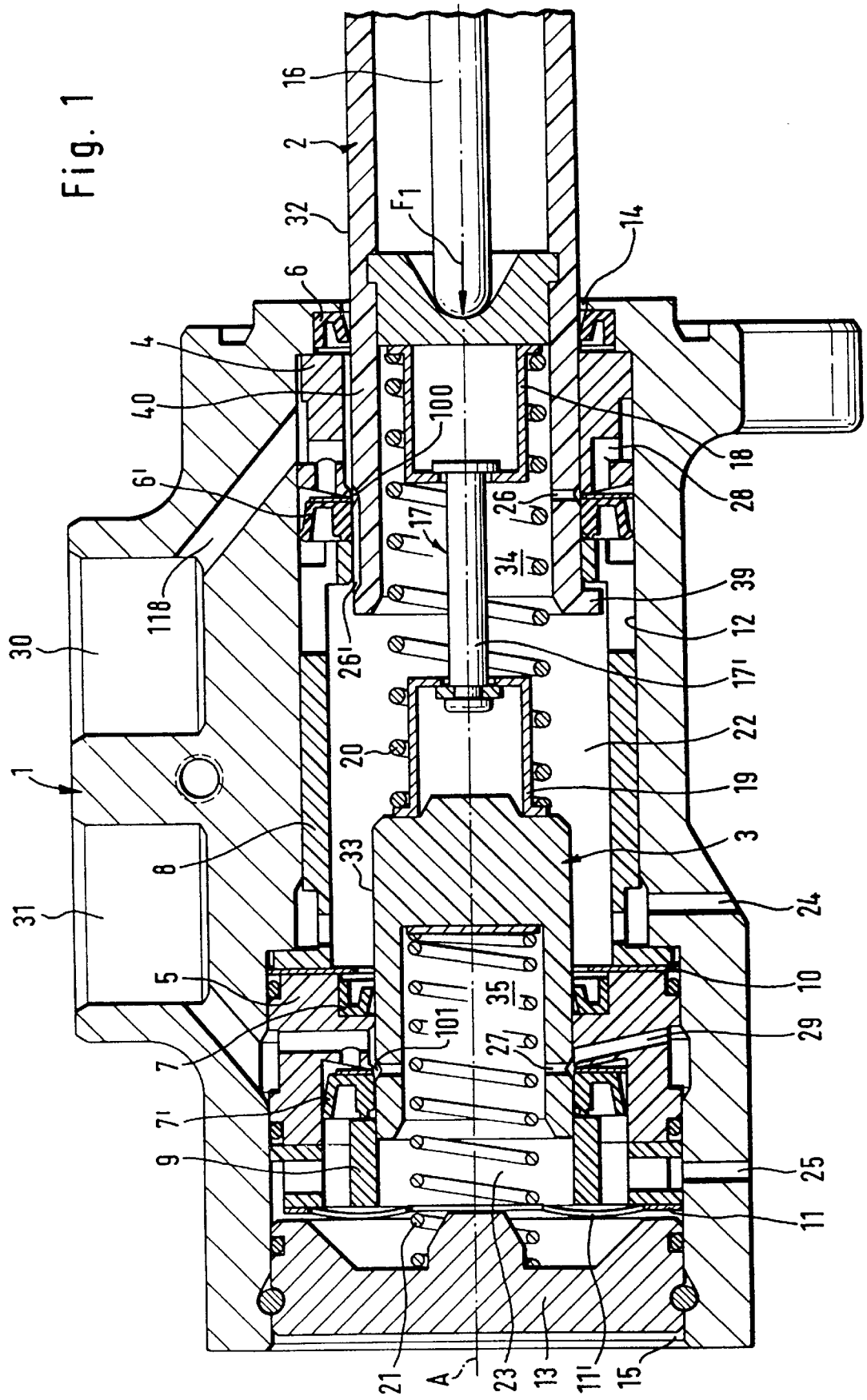

MASTER CYLINDER

BACKGROUND OF THE INVENTION

The present invention relates to a master cylinder, in particular for hydraulic automotive vehicle brake systems.

In U.S. Pat. No. 5,187,934, for example, a master cylinder is disclosed which includes a piston movable therein, which is sealed relative to a pressure chamber by way of a sealing element fixed on the housing, the pressure chamber being connectable to an unpressurized supply chamber by multiple transverse bores provided in the piston. It is a disadvantage in the prior art master cylinder that transverse bores in the piston must be deburred in order to avoid damage to the sealing element when overriding the transverse bores. Also, many small-diameter bores are required to permit a high amount of fluid flow without causing damage to the sealing element. A large-diameter bore would permit a high amount of fluid flow, however, would increase the risk of destroying the sealing element and cause a large lost travel.

SUMMARY OF THE INVENTION

Therefore, an object of the present invention is to provide a generic tandem master cylinder which permits a high amount of fluid flow through the transverse bores without increasing the risk of destroying the sealing element.

According to the present invention, this object is achieved by a master cylinder having transverse bores that open into at least one groove provided on the outer surface of the piston. The groove is used to increase the flow cross-section. The groove, or a plurality of grooves, can extend either in an axial direction, or over part of the periphery of the outer piston surface. The formation of burrs at the port of the transverse bore is of little interest because the port is placed in the groove. Possible burrs do not get into contact with the sealing element, thus, wear or damage to the sealing element is effectively prevented.

Because of its symmetric shape, a circumferential groove is particularly easy to manufacture. A groove of this type also permits a maximum expansion of the flow cross-section and, thus, a slow velocity of flow of the hydraulic medium along with a high amount of fluid flow.

A slight inclination of the lateral surfaces of the groove with respect to the outer surface of the piston causes little impairment of the sealing element when it is overridden by the groove. An inclination of approximately 30° has proved especially suitable because the lateral surfaces are sufficiently flat in this case, i.e., the transition is sufficiently smooth, and an appropriately large fluid flow cross-section is achieved in addition. However, equally good properties are achieved with a discrepancy from this value of about ±15°. It is particularly favorable to configure the cross-section of the groove as a V, with the legs of the V being at an obtuse angle relative to each other. This achieves good properties and a simple manufacture.

The expanded cross-section achieved by the groove of the present invention necessitates only a small number of transverse bores with a correspondingly large cross-section. The cross-section of the transverse bore may be large because, at its port on the outer surface of the piston, the sealing element is not impaired due to the groove of the present invention. Two transverse bores, which lie preferably on one axis, can be manufactured particularly easily, for example, by drilling in one operation. Four bores also bear this advantage. It is even simpler to manufacture one single transverse bore.

A particularly large cross-section and a small axial extension of the transverse bore with respect to the piston axis is achieved when the transverse bore has a slotted shape. A transverse bore of this type is easy to manufacture in punching or injection-molding operations. Transverse bores with an oval cross-section, for example, are also possible.

When the supply chamber is provided in a guide element which guides the piston, the guide element has radial recesses on the side facing the piston according to the present invention.

The recesses are separated from each other in a circumferential direction by at least one web. The piston can abut directly on the web, ensuring an especially proper guide despite the partial recesses in the guide element. In the reset position of the piston, the recesses are connected to the groove according to the present invention and, thus, provide a pressure fluid connection between the pressure chamber and the supply chamber regardless of the respective angular position of the piston relative to the axis of the master cylinder. It is not necessary to fix the orientation of angles. A sufficient flow cross-section is ensured due to the depth of the recesses. At least one recess and one web, which is almost circumferential, is provided to this effect. Or, correspondingly, two or more recesses are provided which are separated from each other by two or more webs.

When the recess extends in an axial direction up to a sealing element which abuts on the guide element, the sealing element can be wetted by hydraulic medium. The durability of the sealing element is increased by this wetting action, especially when the sealing element is adjacent to the outer piston surface.

Further advantages of the present invention can be seen in the following description, making reference to the accompanying drawings.

BRIEF DESCRIPTION OF THE DRAWINGS

In the drawings,

FIG. 1 is a cross-sectional view of a master cylinder according to the present invention.

DETAILED DESCRIPTION OF THE DRAWINGS

Figure 2A:
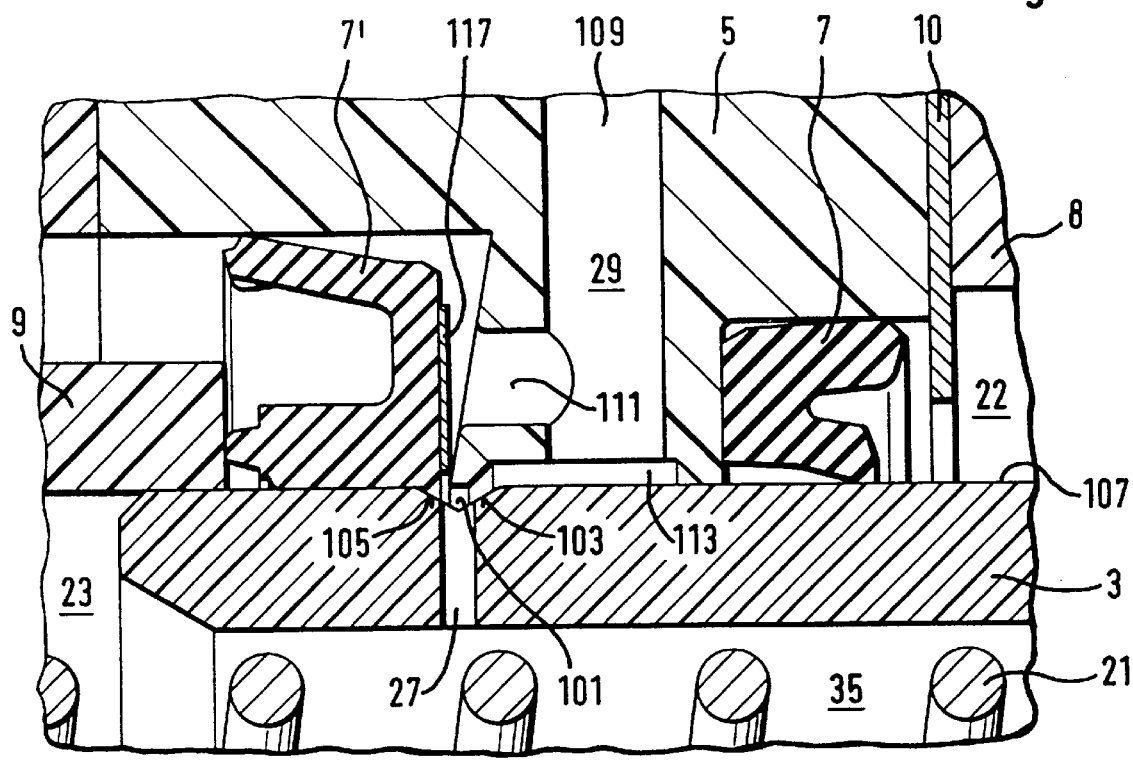
FIGS. 2a, 2b are enlarged cross-sectional views of FIG. 1 proximate the left guide element.

The master cylinder 1 in FIG. 1 is the tandem master cylinder of an automotive vehicle brake system including two pistons 2, 3. The pistons 2, 3 are guided in corresponding guide elements 4, 5 and sealed by sealing elements 6, 6' or 7, 7'.

The sealing elements 6, 6' are axially positioned by the guide element 4 and a sleeve 8. The sealing elements 7, 7' are axially fixed in position by the guide element 5 and a bushing 9. Interposed between the sleeve 8 and the guide element 5 is a washer 10 which also contributes to fixing the sealing element 7 axially in position.

A washer 11 is arranged between a bushing 9 and a closure cap 13. The washer 11 has resilient portions 11' which bear against the closure cap 13 and urge the bushing 9 against the guide element 5. Thus, a compensation is provided for (possibly) slightly different axial positions of the closure cap 13 relative to the bushing 9 or the guide element 7. Small axial tolerances of the individual components can also be compensated this way.

The closure cap 13 closes an opening 15 of the master cylinder 1 from which a stepped axial bore 12 extends to an opening 14. A backward part of the piston 2 projects from the opening 14. A piston rod 16 abuts on the piston 2 to apply an actuating force $F_1$ to the piston 2.

A plastic tube 40 has one or more radial projections 39 at its front end which is disposed in a pressure chamber 22, 23. The radial projections 39 can move into abutment on a step of sleeve 8, with the result that the piston 2 is prevented from dropping out of the master cylinder 1.

The pistons 2 and 3, respectively, have a smooth, cylindrical outer surface 32 and 33, respectively, and include a hollow chamber 34 and 35, respectively. A spring assembly 17, interposed between the pistons 2 and 3, comprising a hollow dowel pin 17', clamping sleeves 18 and 19 and a spring 20, exerts an axial force on piston 3, on displacement of piston 2, to displace piston 3. When no actuating force $F_1$ is applied to the piston 2, piston 2 is reset by the force of spring 20. Piston 3 is reset by the force of the spring 21 which is supported on the closure cap 13.

A primary pressure chamber 22 is arranged between the pistons 2 and 3, and a secondary pressure chamber 23 is arranged between the piston 3 and the closure cap 13. The pressure chambers 22 and 23, respectively, are connnected to different brake circuits of an automotive vehicle by the schematically indicated pressure connections 24 and 25, respectively.

In the reset condition of the pistons 2 and 3, respectively, the pressure chambers 22 and 23 are connected to the supply chambers 28 and 29, respectively, by way of transverse bores 26 and 27 in the corresponding pistons. Supply chambers 28 and 29 are provided in the guide elements 4 and 5, respectively. Instead of a transverse bore 26, an axial groove 26' may be provided which is indicated as an alternative in the half of the piston 2 illustrated above the axis A of master cylinder 1 shown in dotted lines. The supply chambers 28 and 29, respectively, are connected to an unpressurized supply reservoir (not shown) by way of reservoir ports 30 and 31, respectively.

Prior to the operation of the master cylinder 1, the pistons 2, 3 adopt their reset initial position shown. The pressure chambers 22, 23 are connected to the unpressurized compensating reservoir (not shown), and the hydraulic medium in the chambers is unpressurized.

To operate the master cylinder 1, an actuating force $F_1$ is applied to the piston 2 by way of the piston rod 16, piston 2 thereby moving to the left, as viewed in the drawing. Simultaneously, the piston 3 is displaced to the left by the biassed spring 20 of the spring assembly 17. The transverse bores 26, 27 or, if provided, the corresponding axial grooves 26' override the sealing elements 6', 7', with the result that the hydraulic connection between the primary pressure chamber 22 and the supply chamber 28 and between the secondary pressure chamber 23 and the supply chamber 29 is interrupted. Further displacement of the pistons 2, 3 to the left causes an increase in pressure in the pressure chambers 22, 23. Hydraulic medium is conducted through the pressure ports 24, 25 to operate the connected wheel brakes (not shown).

When the actuating force $F_1$ decreases, the pistons 2, 3 are displaced to the right by the pressure prevailing in the pressure chambers 22, 23 and by the force of springs 20, 21. If necessary, hydraulic medium can be aspirated from the supply chambers 28, 29 through the external sealing lip of the sealing elements 6', 7' into the corresponding pressure chambers 22, 23. When the pistons 2, 3 have assumed their initial position, there is again a direct connection between the pressure chambers 22, 23 and the corresponding supply chambers 28, 29 by way of the transverse bores 26, 27.

Return movement of the pistons, or of one of the pistons, to the corresponding initial position can also be effected by a pressure increase in the pressure chamber 22 or 23, respectively.

When a tandem master cylinder according to the present invention is used in a brake system with control (ABS control, TCS control, driving stability control, or the like), a pressure increase of this type can occur during a corresponding control operation.

The transverse bores 26, 27 or, respectively, the axial groove 26', open into a circumferential groove 100, 101 according to the present invention. This arrangement is shown on an enlarged scale in the following Figures.

Figure 2B:
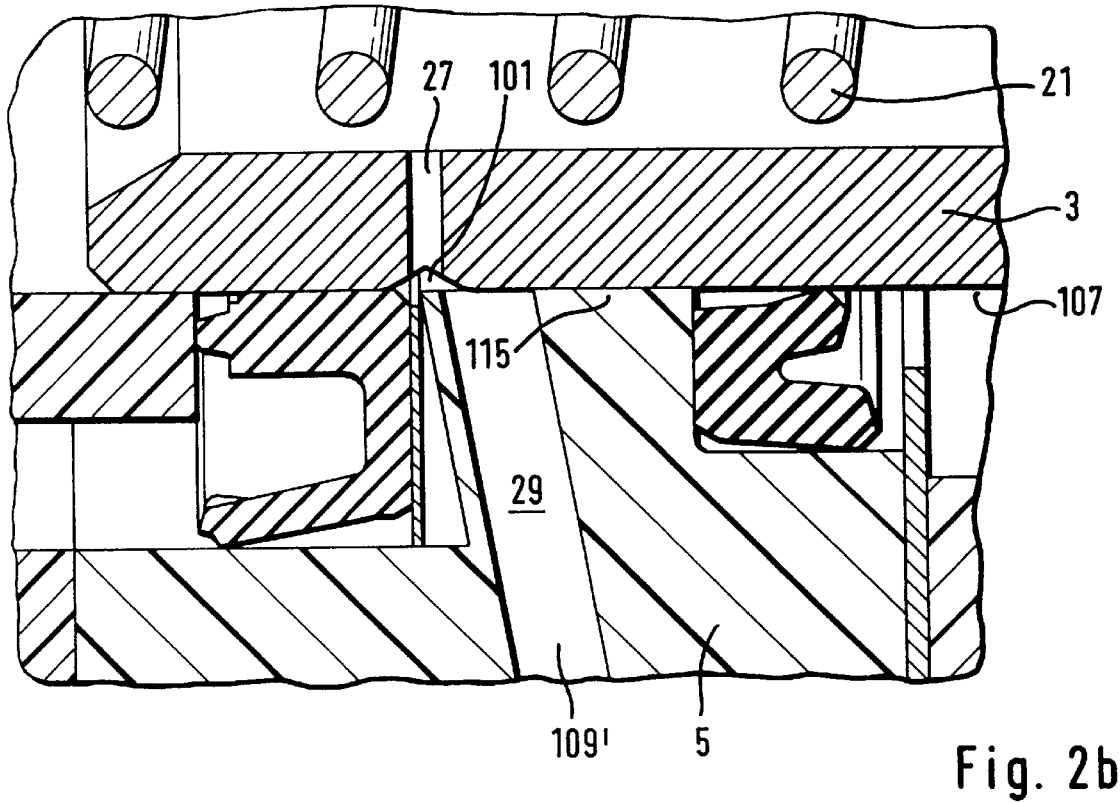

FIG. 2a shows an enlarged cross-sectional view of FIG. 1 proximate the guide element 5 and the part of piston 3 above the axis A, while FIG. 2b shows the respective lower part.

The supply bores configured as transverse bores 27 extend from the hollow chamber 35 of the piston 3 to the groove 101. Groove 101 has a V-shaped cross-section having lateral surfaces 103, 105 which are inclined at an acute angle with respect to the outer piston surface 107. In FIG. 2a, the supply chamber 29 is comprised of a radial bore 109 and an axial bore 11 which are connected to the groove 101 by way of a recess 113 when the piston 3 adopts its reset position as illustrated. The recess 113 extends in an axial direction not entirely until the sealing elements 7 and 7', respectively. When the piston 3 is displaced to the left, there is no slot between the outer piston surface 107 and the guide element 5, into which the sealing elements 7, 7' could be pressed which are acted upon by the pressure that prevails in the pressure chamber 22 and 23, respectively. A supporting disc 117 prevents the sealing element 7' from entering into the axial bore 111. The slot which is produced by the groove 101 when the piston 3 moves to the left is so small in size that the sealing element 7' is not impaired.

In the section shown in FIG. 2b, the supply chamber is configured as a substantially radially extending transverse bore 109' which opens proximate the circumferential groove 101 when the piston 3 has adopted its reset position. A recess, corresponding to the recess 113, to connect the groove 101 to the supply chamber 29 is not required in this case. FIG. 2b shows a web 115 which is provided on either side of the recess 113 in an almost completely circumferential manner.

Figure 3A:
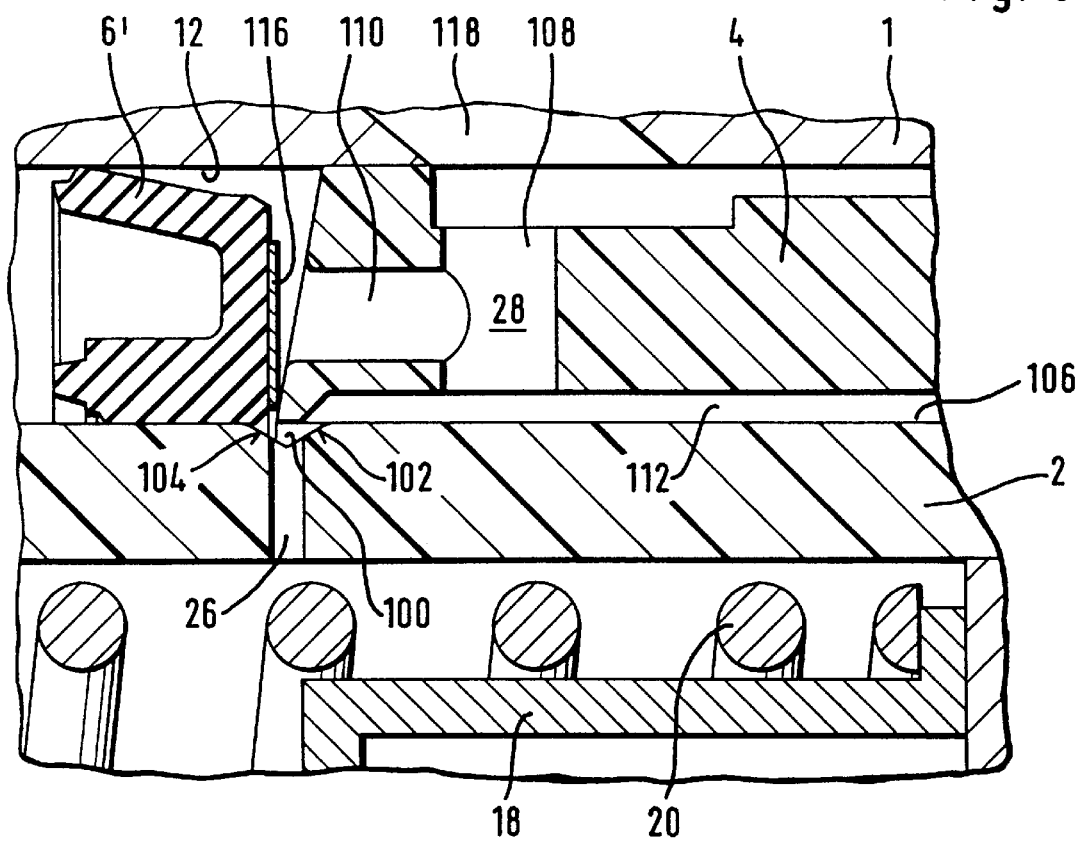
FIGS. 3a, 3b are enlarged cross-sectional views of FIG. 1 proximate the right guide element.
Figure 3B:
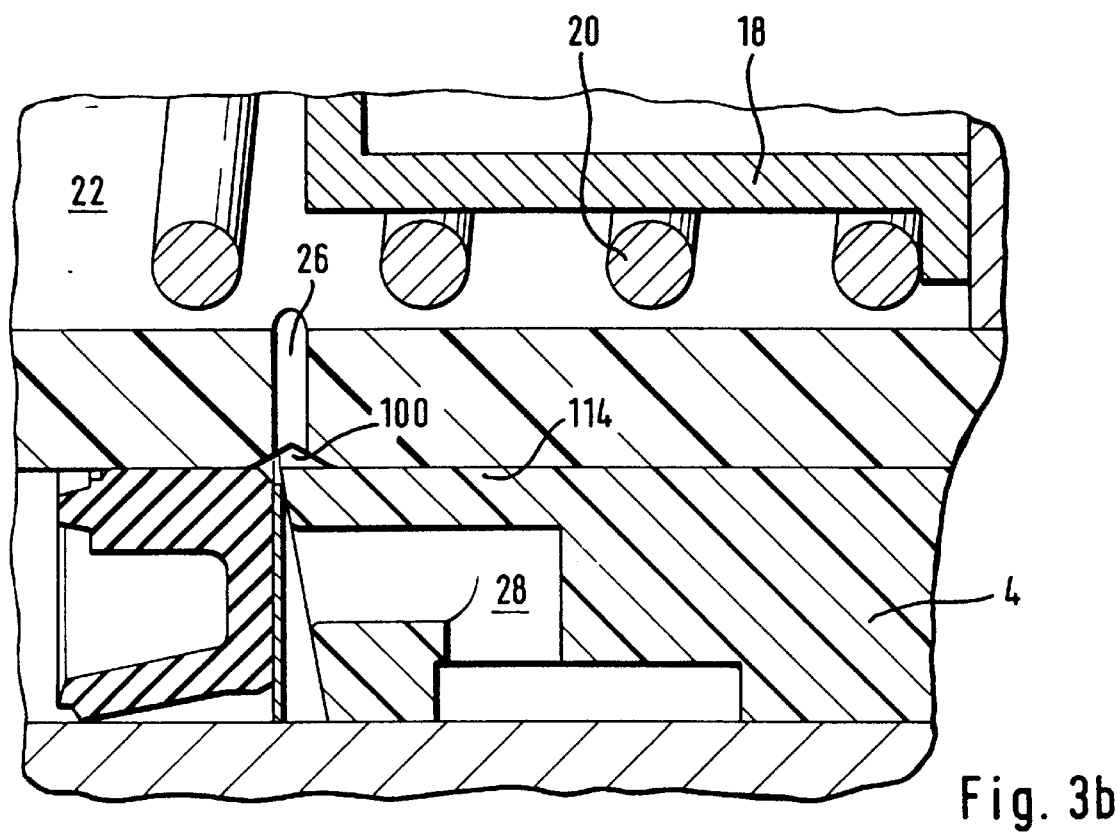

In FIG. 3a, the area of the guide element 4 and the piston 2 above the axis A can be seen. In this case, however, the transverse bore 26 instead of the axial groove 26' is illustrated. FIG. 3b shows the corresponding half below axis A. The transverse bores 26 open into the circumferential groove 100 having lateral surfaces 102, 104 which are designed similarly to FIGS. 2a, 2b.

The supply chamber 28 is comprised of a radial bore 108 and an axial bore 110 and is connected to an unpressurized compensating reservoir (not shown) by way of the supply bore 118. The radial bore 108 opens into a recess 112 of the guide element 4 which extends from the area of the circumferential groove 100 in an axial direction until the area of the sealing element 6 (not shown in FIG. 3a), as can be seen in FIG. 1. On the one hand, bore 108 provides a connection between the supply chamber 28 and the circumferential groove 100 in the reset condition of the piston 2, similarly as described with respect to FIG. 2a. On the other hand, bore 108 is used to wet the sealing element 6 with hydraulic medium.

FIG. 3b shows the web 114 which is arranged between the recesses 112. The circumferential groove 100 is connected to the supply chamber 28 by way of recesses 112 adjacent to web 114, which cannot be seen in this cross-section.

Upon operation, the piston 2 is moved to the left, and groove 100 leaves the area of the guide element 4 and overrides the sealing element 6'. Subsequently, pressure is built up in the pressure chamber 22, with the result that the sealing lips of the sealing element 6' are pressed against the outer piston surface 106 and the stepped bore 12. The supporting disc 116 is urged against the axial bore 110, and the sealing element 6' abuts safely on the supporting disc 116.

The connection between the pressure chamber 22 and the unpressurized reservoir in the nonactuated piston end position, as shown in FIG. 3a, is provided by the circumferential groove 100 according to the present invention. At least one transverse bore 26 opens inwards into groove 100. In the mentioned end position, the groove 100 is connected to the unpressurized reservoir by way of the recess 112 in the guide element 4 on the housing, or by way of a transverse bore exiting at the same location, similar to the transverse bore 109' in FIG. 2b. Thus, a pressure fluid connection is ensured when the piston 2 is reset. Because pressure-loaded sealing elements 6', 7, 7', especially those having a sleeve-type design, are destroyed in large slots by extrusion, the circumferential grooves 100, 101 are rated as small slots. The small slots, nevertheless, have a large cross-section because they have a circumferential design. To permit a large cross-section of the connection, without increasing the extension of the transverse bore 26 in an axial direction of the master cylinder, the transverse bore 26 in FIG. 3b is configured as a slot having its longer axis arranged vertically to the drawing plane.

The present invention discloses that the transverse bores 26 of a master cylinder 1 including a plunger piston 2 open into a circumferential groove 100 provided in the outer surface 106.

We claim:

1. A master cylinder including a housing and a piston movable therein, which is sealed relative to a pressure chamber by way of a sealing element fixed on the housing, the pressure chamber being connectable to an unpressurized supply chamber by at least one transverse bore provided in the piston, wherein at least one groove is provided on the outer surface of the piston, the transverse bore opening into the groove and having a slot-shaped configuration to increase flow of fluid through the transverse bore.

2. The master cylinder as claimed in claim 1, wherein the groove is a circumferential groove.

3. The master cylinder as claimed in claim 1, wherein the lateral surfaces of the groove are inclined only slightly with respect to the outer surface of the piston.

4. The master cylinder as claimed in claim 1, wherein the groove has a cross-section in the shape of a V having legs which are at an obtuse angle relative to each other.

5. The master cylinder as claimed in claim 1, wherein two to four transverse bores having an appropriately large cross-section are provided in the piston.

6. The master cylinder as claimed in claim 1, wherein one transverse bore having an appropriately large cross-section is provided in the piston.

7. The master cylinder as claimed in claim 1, wherein the supply chamber is provided in a guide element in which the piston is guided, the guide element including on the piston side radial recesses which are separated from each other in a circumferential direction by at least one web.

8. The master cylinder as claimed in claim 7, wherein the recess extends axially adjacent to a sealing element, wherein said sealing element abuts on the guide element.

9. A master cylinder including a housing and at least one piston movable therein, which is sealed relative to a pressure chamber by way of a sealing element fixed on the housing, the pressure chamber being connectable to an unpressurized supply chamber by at least one transverse bore provided in the piston,
wherein at least one groove is provided on the outer surface of the piston, the transverse bore opening into the groove and having a slot-shaped configuration;
wherein the groove has a cross-section in the shape of a generally V having two legs, said legs each being at an obtuse angle relative to each other.

10. The master cylinder as claimed in claim 9, wherein the V cross-section is generally symmetrical.

* * * * *